US010355597B2

(12) United States Patent
Oswald et al.

(10) Patent No.: US 10,355,597 B2
(45) Date of Patent: Jul. 16, 2019

(54) POWER SUPPLY AND METHOD FOR CONTROLLING A POWER SUPPLY

(71) Applicant: Valeo Equipements Electriques Moteur, Créteil (FR)

(72) Inventors: Dominique Oswald, Houilles (FR); Boris Bouchez, Cergy (FR)

(73) Assignee: Valeo Equipements Electriques Moteur, Créteil (FR)

( * ) Notice: Subject to any disclaimer, the term of this patent is extended or adjusted under 35 U.S.C. 154(b) by 0 days.

(21) Appl. No.: 14/698,131

(22) Filed: Apr. 28, 2015

(65) Prior Publication Data

US 2015/0311807 A1    Oct. 29, 2015

(30) Foreign Application Priority Data

Apr. 29, 2014 (FR) ...................................... 14 53865

(51) Int. Cl.
*H02M 3/335* (2006.01)
*H02M 7/48* (2007.01)

(52) U.S. Cl.
CPC ... *H02M 3/33507* (2013.01); *H02M 3/33538* (2013.01); *Y02B 70/1433* (2013.01)

(58) Field of Classification Search
CPC .............. H02M 3/335; H02M 3/33507; H02M 2007/4815; H02M 2007/4818; H02M 3/33538

(Continued)

(56) References Cited

U.S. PATENT DOCUMENTS 4,788,634 A * 11/1988 Schlecht ........... H02M 3/33538
                                                              323/266
4,823,249 A *  4/1989 Garcia, II ............... H02M 1/44
                                                              363/126

(Continued)

FOREIGN PATENT DOCUMENTS

DE         102004006004       *   6/2005

OTHER PUBLICATIONS

Translation of DE102004006004.*
Preliminary Search Report issued in corresponding French Patent Application 1453865 dated Aug. 18, 2014 (8 pages).

*Primary Examiner* — Gary L Laxton
*Assistant Examiner* — Sisay G Tiku
(74) *Attorney, Agent, or Firm* — Osha Liang LLP

(57) ABSTRACT

A power supply having a transformer, a magnetizing current regulation circuit, and a device for controlling the regulation circuit intended to switch the regulation circuit alternately from the magnetizing state to the demagnetizing state is disclosed. The control device is intended to prolong the magnetization phase for a magnetization time $(T_F)$. The power supply also includes an output capacitor connected to a secondary of the transformer so as to form a resonant circuit with the leakage inductor, the voltage between the terminals of the output capacitor corresponding to the output voltage $(V_S)$ of the power supply. The magnetization time $(T_F)$ and the value of the output capacitor are such that, on the resonance portion of the magnetization phase, the output voltage $(V_S)$ describes a sine wave portion and, starting from an initial value $(V_{S0})$ below the median value of the sine wave, passes through said median value.

20 Claims, 8 Drawing Sheets

(58) Field of Classification Search
USPC .......................................... 363/21.02–21.04
See application file for complete search history.

(56) References Cited

U.S. PATENT DOCUMENTS

| | | | | |
|---|---|---|---|---|
| 4,864,479 A * | 9/1989 | Steigerwald | ............ | H02M 1/38 363/132 |
| 5,111,372 A * | 5/1992 | Kameyama | ....... | H02M 3/33569 363/16 |
| 5,126,931 A * | 6/1992 | Jitaru | ................ | H02M 3/33569 363/131 |
| 5,132,889 A * | 7/1992 | Hitchcock | ............ | H02M 3/337 363/132 |
| 5,325,283 A * | 6/1994 | Farrington | ............ | H02M 3/335 363/132 |
| 5,434,767 A * | 7/1995 | Batarseh | ............. | H02M 1/4208 323/222 |
| 5,608,613 A * | 3/1997 | Jansen | .............. | H02M 3/33507 363/131 |
| 5,636,106 A * | 6/1997 | Batarseh | ............. | H02M 1/4208 323/222 |
| 7,209,370 B2 * | 4/2007 | Phadke | ............... | H02M 3/3376 363/132 |
| 7,570,497 B2 * | 8/2009 | Jacques | ............. | H02M 3/33507 363/21.03 |
| 7,738,266 B2 * | 6/2010 | Jacques | ............. | H02M 3/33553 363/21.02 |
| 7,859,870 B1 * | 12/2010 | Schutten | ............... | H02M 3/337 363/132 |
| 7,869,237 B1 * | 1/2011 | Schutten | ........... | H02M 3/33569 363/132 |
| 8,023,294 B2 * | 9/2011 | Ryan | ....................... | H02M 1/14 323/335 |
| 8,320,138 B2 * | 11/2012 | Aso | ..................... | H02M 3/3378 363/131 |
| 9,421,547 B2 * | 8/2016 | Boast | ...................... | B02C 1/025 |
| 9,461,547 B2 * | 10/2016 | Liu | ................... | H02M 3/33507 |
| 9,548,652 B2 * | 1/2017 | Cao | ........................ | H02M 1/32 |
| 9,621,056 B2 * | 4/2017 | Wu | ................... | H02M 3/33507 |
| 2002/0070720 A1 * | 6/2002 | L'Hermite | ........ | H02M 3/33507 323/284 |
| 2005/0152160 A1 * | 7/2005 | Fung | ................. | H02M 3/33538 363/18 |
| 2010/0165669 A1 * | 7/2010 | Li | ........................... | H02M 1/34 363/21.04 |
| 2011/0013424 A1 * | 1/2011 | Wang | ............... | H02M 3/33576 363/21.06 |
| 2011/0149607 A1 * | 6/2011 | Jungreis | ............. | H02M 3/3376 363/21.02 |
| 2011/0163756 A1 * | 7/2011 | Wang | .................... | G01N 27/023 324/537 |
| 2011/0182089 A1 * | 7/2011 | genannt Berghegger | .................... | H02M 3/33507 363/21.13 |
| 2012/0026765 A1 * | 2/2012 | Adragna | ............ | H02M 1/4225 363/78 |
| 2012/0039098 A1 * | 2/2012 | Berghegger | ...... | H02M 3/33507 363/21.13 |
| 2012/0250367 A1 * | 10/2012 | Desimone | ............... | H02M 1/44 363/21.17 |
| 2013/0088897 A1 * | 4/2013 | Adragna | ........... | H02M 3/33507 363/21.12 |
| 2013/0135775 A1 * | 5/2013 | Yao | ........................ | H02H 9/025 361/18 |
| 2014/0029316 A1 | 1/2014 | Adragna | | |
| 2016/0329814 A1 * | 11/2016 | Fahlenkamp | ..... | H02M 3/33523 |

* cited by examiner

POWER SUPPLY AND METHOD FOR CONTROLLING A POWER SUPPLY

TECHNICAL FIELD

The present invention relates to the field of power supplies. In particular, the invention relates to an isolated resonant power supply. In addition, the invention relates to an inverter for supplying an electrical machine. The inverter includes a high-voltage portion and a low-voltage portion separated by a galvanic isolation barrier, and a power supply according to the invention for transmitting energy through the isolation barrier.

TECHNOLOGICAL BACKGROUND

In order to supply an electrical load through a galvanic isolation barrier, it is known to use an isolated power supply comprising a transformer. The transformer comprises a primary connected to its terminals with a voltage source and a secondary connected to the electrical load. In this known power supply, the purpose of an output capacitor connected to the terminals of the secondary is to store electrical energy and accordingly has a very large value, generally more than a microfarad.

In particular an isolated resonant power supply is known which uses a resonance between a capacitor and an inductor for zero voltage switching or ZVS of a switch belonging to the power supply. The document 'A novel resonant converter topology for DC-to-DC power supply' by Liu et al. published in 'IEEE Transactions on Aerospace and Electronic Systems', Vol. 31, No 4, October 1995, 1301, discloses an example of a resonant power supply. One problem of resonant power supplies is that their output voltage may depend on the impedance of the electrical load supplied by the power supply.

The present invention is therefore aimed at obtaining an isolated resonant power supply in which the output voltage is independent of the impedance of the load at the output of the power supply.

SUMMARY OF THE INVENTION

To this end, a power supply is provided comprising:
a transformer comprising a primary intended to be connected to a voltage source and having a leakage inductor, the transformer being intended to be traversed by a magnetizing current,
a magnetizing current regulation circuit intended to switch between:
  a magnetizing state in which the regulation circuit is intended to allow the magnetizing current to increase, and
  a demagnetizing state in which the regulation circuit is intended to reduce the magnetizing current,
a device for controlling the regulation circuit intended to switch the regulation circuit alternately from the magnetizing state to the demagnetizing state for respectively alternating a magnetization phase and a demagnetization phase, the control device being intended to prolong the magnetization phase for a magnetization time,
an output capacitor connected to a secondary of the transformer so as to form a resonant circuit with the leakage inductor, the voltage between the terminals of the output capacitor corresponding to the output voltage of the power supply, characterized in that the magnetization time and the value of the output capacitor are such that, on one portion, called the resonance portion, of the magnetization phase, the output voltage describes a sine wave portion and, starting from an initial value below the median value of the sine wave, passes through said median value.

In particular, the initial value of the output voltage is the value of the output voltage at the beginning of the resonance phase, which may correspond to the beginning of the magnetization phase.

The power supply according to the invention is in particular intended to deliver a constant voltage. The constant voltage corresponds more particularly to the average value of the output voltage. This average value of the output voltage may be different from the median value of the sine wave followed by the output voltage on the resonance phase.

In at least one portion of the magnetization phase, a resonant power supply has an output voltage including a lower peak value of a sine wave followed by the output voltage in this portion of the magnetization phase.

When the load impedance at the output of a resonant power supply increases, the lower peak value of the sine wave drifts towards lower values. In a resonant power supply of the prior art, the magnetization state stops before the output voltage has reached the median value of the sine wave. In the power supply according to the invention, the magnetization state stops at least after the output voltage has reached the median value of the sine wave. Thus, the drift of the lower peak value of the sine wave towards lower values is compensated at least partly by the corresponding drift of the upper peak value of the sine wave towards higher values.

Similarly, when the load impedance at the output of a resonant power supply decreases, the drift of the lower peak value of the sine wave towards higher values is compensated at least partly by the corresponding drift of the upper peak value of the sine wave towards lower values.

The influence of the output load impedance on the output voltage is therefore reduced compared with a prior art resonant power supply.

Optionally, the resonance portion extends over the entire magnetization phase.

Also optionally, the magnetization time and the value of the output capacitor are such that, on the resonance portion, the output voltage passes through the upper peak value of the sine wave.

Thus, when the load impedance at the output of a resonant power supply increases, the drift of the lower peak value of the sine wave towards lower values is compensated, almost completely, or even completely, by the corresponding drift of the upper peak value of the sine wave towards higher values.

Similarly, when the load impedance at the output of a resonant power supply decreases, the drift of the lower peak value of the sine wave towards higher values is compensated, almost completely, or even completely, by the corresponding drift of the upper peak value of the sine wave towards lower values.

The influence of the output load impedance on the output voltage is therefore substantially low, or even zero, compared with a prior art resonant power supply.

The power supply according to the invention is in particular intended to deliver a constant voltage. The constant voltage corresponds more particularly to the average value of the output voltage. This average value of the output voltage may correspond to the median value of the sine wave followed by the output voltage on the resonance phase.

Also optionally, the magnetization time and the value of the output capacitor are such that, after passing the upper peak value of the sine wave, the output voltage decreases during the rest of the resonance portion up to but not exceeding the median value of the sine wave, and preferably by an amount of no more than 50% of the difference between the upper peak value of the sine wave and the median value, and more preferably by an amount of no more than 25% of the difference between the upper peak value of the sine wave and the median value.

Also optionally, the magnetization time is between 25% and 75% of the sine wave period.

Optionally, the variations in the output voltage during the resonance portion describe a sine wave portion having a period dependent on the value of the output capacitor, the value of the output capacitor being such that said period is between 0.1 and 2 microseconds.

Also optionally, the magnetization time is between:

$$\frac{\pi}{2}\sqrt{L_F C_S} \quad \text{and} \quad \frac{3\pi}{2}\sqrt{L_F C_S}$$

where $L_F$ is the value of the leakage inductor of the transformer and $C_S$ is the value of the output capacitor.

Also optionally, the output capacitor has a value between 0.5 and 200 nanofarads, e.g. 50 nanofarads.

Also optionally, the transformer secondary comprises a high terminal intended to present a high potential and through which a secondary current is intended to be output and a low terminal intended to present a low potential with respect to the high potential of the high terminal.

Also optionally, the power supply further comprises:
a diode intended to prevent the flow of a secondary current to the transformer secondary via its high terminal.

In particular, the diode has its anode connected to the high terminal of the transformer secondary.

Also optionally, the magnetization time is such that, at the end of the magnetization state, the secondary current is zero or is no more than 5% of its peak value.

Also optionally, the regulation circuit comprises:
a switch of which the closed state corresponds to one of the magnetizing and demagnetizing states of the regulation circuit and of which the open state corresponds to the other of the magnetizing and demagnetizing states of the regulation circuit, and
a demagnetization capacitor intended to cause an oscillation of the magnetization current during the demagnetization phase in the course of which the regulation circuit is in the demagnetizing state.

Also optionally, the demagnetization capacitor is in parallel with the switch.

Also optionally, the demagnetization capacitor is connected between the terminals of the transformer primary.

Also optionally, the demagnetization capacitor is in parallel with the diode.

Also optionally, the demagnetization capacitor is further intended to cause an oscillation of the voltage at the terminals of the switch during the demagnetization phase, and the control device is intended to prolong the demagnetization phase during a demagnetization time such that, at the end of the demagnetization time, when the switch is closed for passing from the demagnetizing state to the magnetizing state, the voltage at the terminals of the switch is zero or is no more than 5% of its peak value.

Also optionally, the power supply further comprises a device for measuring the peak-to-peak value of the output voltage.

Also optionally, the measuring device is further intended to estimate an output current supplied by the terminal of the output capacitor connected to the high terminal of the transformer secondary from the peak-to-peak value of the output voltage.

The invention also relates to a voltage converter including:
a circuit having a first portion linked to a first electrical earth and a second portion linked to a second electrical earth, said portions being separated by a galvanic isolation,
a power supply according to the invention intended to supply an electrical load located in one of the portions with energy originating from the other portion through said galvanic isolation.

In particular, the converter is a DC-AC converter for supplying an electrical machine. The converter may also be a DC-DC converter.

A method for controlling a power supply is also provided comprising:
a transformer comprising a primary intended to be connected to a voltage source and having a leakage inductor, the transformer being intended to be traversed by a magnetizing current,
a magnetizing current regulation circuit intended to switch between:
a magnetizing state in which the regulation circuit is intended to allow the magnetizing current to increase, and
a demagnetizing state in which the regulation circuit is intended to reduce the magnetizing current,
an output capacitor connected to a secondary of the transformer so as to form a resonant circuit with the leakage inductor, the output capacitor having an output voltage between its terminals,
the method comprising:
switching the regulation circuit alternately from the magnetizing state to the demagnetizing state for respectively alternating a magnetization phase and a demagnetization phase, the magnetization phase lasting for a magnetization time, which is a function of the value of the output capacitor in such a way that, on one portion, called the resonance portion, of the magnetization phase, the output voltage describes a sine wave portion and, starting from an initial value below the median value of the sine wave, passes through said median value.

DESCRIPTION OF THE FIGURES

Embodiments of the invention will now be described solely by way of example, with reference to the following figures.

DETAILED DESCRIPTION

Figure 1:
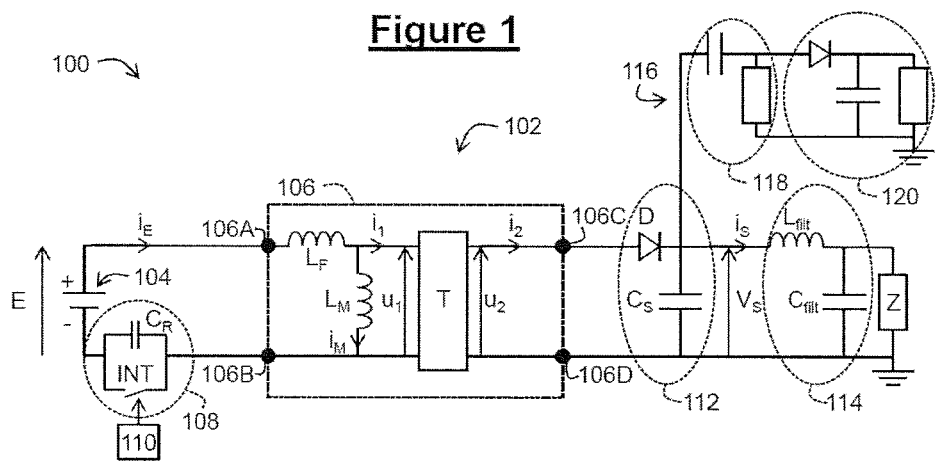
FIG. 1 represents an electrical circuit comprising a power supply according to a first embodiment of the invention.

With reference to FIG. 1, an electrical circuit 100 implementing the invention will now be described.

The electrical circuit 100 comprises a power supply 102 and a load Z intended to be supplied by the power supply 102.

The power supply 102 first of all comprises a voltage source 104 intended to present a supply voltage E between its positive terminal (+) and its negative terminal (−) and to provide a supply current $i_E$ via its positive terminal (+). In the example described, the supply voltage E is continuous and constant.

The power supply 102 further comprises a transformer 106 intended, in the example described, to divide the power supply voltage E.

The transformer 106 comprises a primary winding, subsequently simply called the 'primary', and a secondary winding, subsequently simply called the 'secondary'.

The primary has a high terminal 106A and a low terminal 106B, the high terminal 106A being intended to present a higher potential than that of the low terminal 106B.

The secondary has a high terminal 106C and a low terminal 106D, the high terminal 106C being intended to present a higher potential than that of the low terminal 106D.

In the context of the present invention, the transformer 106 is modelled in the following way.

The transformer 106 first of all comprises an ideal transformer T including an ideal primary and an ideal secondary.

The ideal primary has a high terminal and a low terminal, the high terminal being intended to present a higher potential than that of the low terminal. A primary current enters the ideal primary via its high terminal. The ideal primary further presents a primary voltage $u_1$ between its terminals.

The ideal secondary has a high terminal and a low terminal, the high terminal being intended to present a higher potential than that of the low terminal. A secondary current $i_2$ exits the ideal primary via its high terminal. The ideal secondary further presents a secondary voltage $u_2$ between its terminals.

The ideal transformer T further presents a transformation ratio n connecting the currents and the primary and secondary voltages in the following way:

$$n = \frac{u_2}{u_1} = \frac{i_1}{i_2}$$

The transformer 106 further comprises a magnetizing inductor $L_M$ arranged between the terminals of the ideal primary and traversed by a magnetizing current $i_M$. The magnetizing inductor $L_M$ reflects the fact that the core reluctance of the transformer 106 is not zero.

The transformer 106 further comprises a leakage inductor $L_F$ having a terminal connected to the high terminal of the ideal primary, the other terminal of the leakage inductor $L_F$ corresponding to the high terminal 106A of the transformer 106. The leakage inductor $L_F$ reflects the fact that the magnetic circuit of the transformer 106 does not channel quite all of the magnetic field created by the primary. In other words, the lines of the magnetic field escape out of the transformer 106 and are not used by the secondary.

Furthermore, the low terminal of the ideal primary corresponds to the low terminal 106B of the transformer 106.

Generally, the magnetizing inductor $L_M$ is much greater, i.e. for example at least 50 times greater, preferably 100 times greater, than the leakage inductor $L_F$.

The power supply 102 further comprises a regulation circuit 108 for controlling the magnetizing current $i_M$, intended to maintain the magnetizing current $i_M$ at a reasonable level, i.e. less than or of the same order of magnitude as the expected primary current $i_1$ for the maximum load Z for which the power supply 102 was designed.

The regulation circuit 108 is, for example, interposed between the voltage source 104 and the transformer 106. In the example described, the regulation circuit 108 is interposed between the low terminal 106B of the transformer 106 primary and the negative terminal (−) of the voltage source 104, while the high terminal 106A of the transformer 106 primary is connected directly to the positive terminal (+) of the voltage source 104.

The regulation circuit 108 is intended to switch between two states, respectively called the magnetizing and demagnetizing state. In the magnetizing state, the regulation circuit 108 is intended to allow the voltage source 104 to magnetize the transformer 106, i.e. to allow the magnetizing current $i_M$ to increase. In the demagnetizing state, the regulation circuit 108 is intended to demagnetize the transformer 106, i.e. reduce the magnetizing current $i_M$.

In the example described, the regulation circuit 108 comprises, first, a switch INT, connecting the negative terminal (−) of the voltage source 104 to the low terminal 106B of the transformer 106 primary and, secondly, a capacitor $C_R$, called a demagnetizing capacitor, in parallel with the switch INT.

Thus, when the switch INT is closed (which corresponds to the magnetizing state), the low terminal 106B is connected directly to the negative terminal (−) of the voltage source 104, by short-circuiting the capacitor $C_R$. The supply voltage E is thus applied to the transformer 106 primary.

When the INT switch is open (which corresponds to the demagnetizing state), the low terminal 106B is connected to the negative terminal (−) of the voltage source 104 through the demagnetization capacitor $C_R$, creating a resonance between the demagnetization capacitor $C_R$ and the leakage $L_F$ and magnetization $L_M$ inductors, as will be explained later. The voltage at the terminals of the switch INT is referred to hereafter as voltage $V_{INT}$.

The power supply 102 further comprises a device 110 for controlling the regulation circuit 108 intended to switch the regulation circuit 108 alternately from one state to the other, for respectively alternating a magnetization phase (corresponding to the magnetizing state of the electrical circuit 108) and a demagnetization phase (corresponding to the demagnetizing state of the electrical circuit 108). The control device 110 is intended to prolong the magnetization phase (regulation circuit 108 in the magnetization state) for a magnetization time $T_F$ and to prolong the demagnetization phase (regulation circuit 108 in the demagnetization state) for a demagnetization time $T_O$.

The magnetization time $T_F$ is preferably chosen such that, at its end, i.e. at the opening of the switch INT for passing from the magnetizing state to the demagnetizing state, the secondary current $i_2$ is zero or is no more than 5% of its peak value.

The demagnetization time $T_O$ is preferably chosen such that, at its end, i.e. at the closure of the switch INT for passing from the demagnetizing state to the magnetizing state, the voltage $V_{INT}$ at the terminals of the switch INT is zero or is no more than 5% of its peak value.

In the example described, the magnetization time $T_F$ and demagnetization time $T_O$ may be determined beforehand from the characteristics of the power supply 102, such as, for example, a constant voltage that the power supply is intended to deliver at the output. The magnetization time $T_F$ and demagnetization time $T_O$ are preferably recorded in a memory of the control device 110 for being used during the operation of the power supply 102.

It will be appreciated that the magnetization time $T_F$ and demagnetization time $T_O$ may be chosen independently of each other.

The power supply 102 further comprises an output stage 112 of the transformer 106.

The output stage 112 first of all comprises a diode D connected to the high terminal 106C of the transformer 106 secondary and intended to prevent the secondary current $i_2$ from becoming negative, i.e. from entering the secondary winding.

The output stage 112 further comprises an output capacitor $C_S$ having a terminal connected via the diode D to the high terminal 106C of the transformer 106 secondary and another terminal connected to the low terminal 106D of the transformer 106 secondary. The output capacitor $C_S$ thus connected forms a resonant circuit with the leakage inductor $L_F$ of the transformer 106. The output capacitor $C_S$ is further intended to present a voltage $V_S$ between its terminals whereof the average value corresponds in particular to a constant voltage that the power supply must deliver.

As will be explained in more detail later, the magnetization time $T_F$ and the value of the output capacitor $C_S$ are such that, on a resonance portion of the magnetization phase, the output voltage $V_S$ describes a sine wave portion and, starting from an initial value below the median value of the sine wave, passes through said median value. For example, the output capacitor $C_S$ has a value between 0.5 and 200 nanofarads, e.g. between 5 and 100 nanofarads, e.g. equal to 50 nanofarads.

The output stage 112 supplies an output current $i_S$ from the terminal of the output capacitor $C_S$ connected to the high terminal 106C of the transformer 106 secondary. For filtering the output current $i_S$, the power supply 102 may comprise an output filter 114 interposed between the output stage 112 and the load Z. The output filter 114 receives the output current $i_S$ and the output voltage $V_S$ is applied thereto. The output filter 114 is intended to filter the output current $i_S$, so that this current is quasi-constant at the operating frequency of the power supply 102 (corresponding to the period $T_O+T_F$). The output filter 114 is particularly useful when the load Z comprises capacitors which would interfere with the resonance if they were connected directly behind the output stage 112.

In the example described, the output filter 114 is an LC filter comprising an inductor $L_{filt}$ and a capacitor $C_{filt}$. As a variant, the output filter 114 may be replaced by a linear regulator, e.g. a Low-Dropout Regulator or LDO.

The power supply 102 may further comprise a device 116 for measuring the peak-to-peak value of the output voltage $V_S$.

In the example described, the measuring device 116 first of all comprises a high-pass filter 118. For example, the high-pass filter 118 comprises an RC filter. The high-pass filter 118 is followed by a peak detector circuit 120 comprising, for example, a diode followed by a capacitor and a resistor in parallel with each other.

The measuring device 116 is further intended for estimating the output current $i_S$ from the measurement of the peak-to-peak value of the output voltage $V_S$. Indeed, this peak-to-peak value depends directly on the output capacitor $C_S$, the output current $i_S$ and the operating frequency of the power supply 102. Estimating the output current $i_S$ can be used, for example, to set up an overcurrent protection in the power supply 102.

Referring to FIGS. 2 to 5, a method 500 for operating the electrical circuit 100 will now be described.

In order to simplify the description, it is assumed that the transformation ratio n of the ideal transformer T is 1. Thus, in this case, the primary current $i_1$ and the secondary current $i_2$ are equal. Hereafter they will be called the primary/secondary current i. Similarly, the primary voltage $u_1$ and the secondary voltage $u_2$ are equal. Hereafter they will be called the primary/secondary voltage u.

In addition, the output filter 114 and the load Z are modelled by a constant current source $I_s$.

Figure 2:
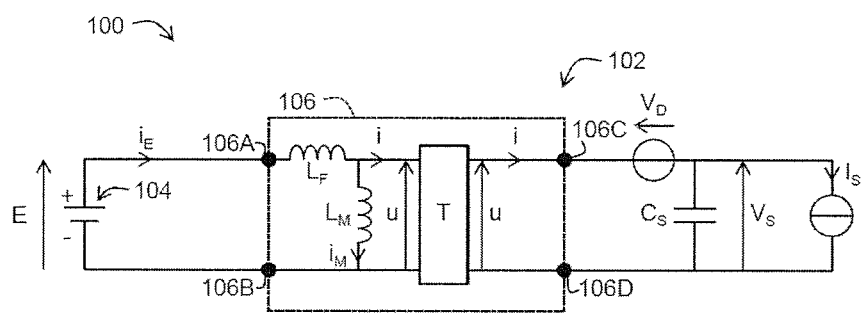
FIGS. 2 to 4 represent equivalent electrical diagrams of the electrical circuit in FIG. 1 in various operating states.

At a step 502, the control device 110 switches the regulation circuit 108 to the magnetizing state by closing the switch INT. Accordingly, the diode D is switched on and has a voltage $V_D$ at its terminals. The resultant circuit diagram is represented in FIG. 2.

At the moment of closure of the switch INT, the output voltage $V_S$, the magnetizing current $i_M$, the voltage $V_{INT}$ of the switch INT and the primary/secondary current i have the following values:

$$V_S(0)=V_{S0}$$

$$i_M(0)=i_{M0}$$

$$V_{INT}(0)=0$$

$$i(0)=0$$

Hereafter the value $V_{S0}$ is called the 'initial resonance value'.

Following step 502, a magnetization phase 503 begins.

During a step 504 taking place over a portion of the magnetization phase 503, the electrical quantities evolve over time in the manner which will now be described. In particular, as will be explained, the output capacitor $C_S$ and the leakage inductor $L_F$ form a resonant circuit so that the output voltage $V_S$ describes a sine wave portion. Step 504 lasts for a resonance time $T_{rés}$. The following equations are deduced from FIG. 2:

$$E=L_F i_E'+L_M i_M'=L_F i_E'+V_D+V_S$$

$$i_E=i+i_M$$

$$i=I_S+C_S V_S'$$

Thus, taking into account the fact that the magnetizing inductor $L_M$ is much greater than the leakage inductor $L_F$, the output voltage $V_S$ satisfies the differential equation:

$$E-V_D=L_F C_S V_S''+V_S$$

Thus, taking into account the initial conditions:

$$V_S(0)=V_{S0}$$

$$i(0)=0=I_S+C_S V_S'(0)$$

the output voltage $V_S$ and the primary/secondary current i oscillate according to the following equations:

$$V_S = E - V_D - (E - V_D - V_{S0})\frac{\cos(\omega_1 t - \varphi_1)}{\cos(\varphi_1)}$$

$$i = I_S + \omega_1 C_S(E - V_D - V_{S0})\sin(\omega_1 t - \varphi_1) = I_S\left(1 + \frac{\sin(\omega_1 t - \varphi_1)}{\sin(\varphi_1)}\right)$$

with: $\omega_1 = \frac{1}{\sqrt{L_F C_S}}$ and: $\varphi_1 = \arctan\left(\frac{I_S}{\omega_1 C_S(E - V_D - V_{S0})}\right)$ Thus, according to the expression for the oscillation pulse $\omega_1$, the oscillation of the output voltage $V_S$ and of the primary/secondary current i is caused by the presence of the output capacitor $C_S$ which with the leakage inductor $L_F$ forms a resonant circuit.

In addition, it will be appreciated that the output voltage $V_S$ oscillates about the median value V which is equal in particular to $E-V_D$.

Furthermore, the appearance of a sine wave, which the output voltage $V_S$ displays during the resonance period 504, has a period $T_{osc}$ equal to:

$$T_{osc} = \frac{2\pi}{\omega_1} = 2\pi\sqrt{L_F C_S}$$

Thus, the period $T_{osc}$ of the sine wave depends on the value of the output capacitor $C_S$. Preferably, the value of the output capacitor $C_S$ is such that the sine wave period $T_{osc}$ is between 0.1 and 2 microseconds.

Furthermore, the magnetizing current $i_M$ evolves according to the equation:

$$i_M = i_{M0} + \frac{E}{L_M}t + \frac{I_S}{\omega_1^2 L_M C_S}\left(1 + \frac{\sin(\omega_1 t - \varphi_1)}{\sin(\varphi_1)}\right)$$

The sine wave term is in general very small compared with the linear portion, so that the magnetizing current $i_M$ increases in a quasi-linear way.

Figure 3:
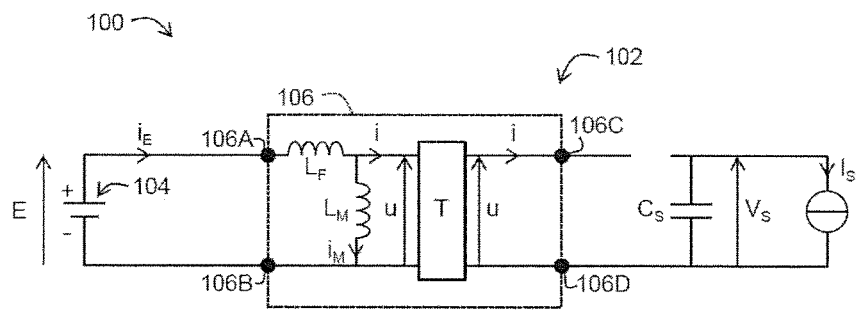

At a step 506 occurring at the end of a time $(\pi+2\varphi_1)/\omega_1$ after the closure of the switch INT, the primary/secondary current i has made a half oscillation and returns to zero, so that the diode D is switched off. The resultant circuit diagram is represented in FIG. 3. As will be explained later, switching off the diode causes the resonance for the output voltage $V_S$ to stop.

When the diode D is switched off, the output voltage $V_S$ has reached a final resonance value $V_{s1}$, which is preferably greater than the initial resonance value $V_{S0}$. The final resonance value $V_{S1}$ equals:

$$V_{S1} = E - V_D + (E - V_D - V_{S0}) = 2E - 2V_D - V_{S0}$$

In addition, the magnetizing current $i_M$ has increased until it reaches the value $i_{M1}$:

$$i_{M1} = i_{M0} + \frac{E}{L_M} \cdot \frac{\pi + 2\varphi_1}{\omega_1} + \frac{2I_S}{\omega_1^2 L_M C_S}$$

During a step 508 taking place over the rest of the magnetization phase 506, the electrical quantities evolve over time in the manner which will now be described.

The current stored in the output capacitor $C_S$ is discharged in the current generator $I_S$, so that the output voltage $V_S$ decreases according to the equation:

$$V_S = V_{S1} - \frac{I_S}{C_S}t$$

Moreover, the voltage source 104 continues to magnetize the transformer T, so that the magnetizing current $i_M$ increases linearly according to the equation:

$$i_M = i_{M1} + \frac{E}{L_F + L_M}t$$

Of course, if the magnetization time $T_F$ is chosen equal to or less than $(\pi+2\varphi_1)/\omega_1$, i.e. if it ends before or at the moment of diode D being switched off, then step 508 does not occur. In this case, the output voltage $V_S$ resonates throughout the magnetization phase 503, and the resonance time $T_{rés}$ is equal to the magnetization time $T_F$.

If the magnetization time is chosen less than $(\pi+2\varphi_1)/\omega_1$ (before the primary/secondary current has had time to cancel out), the magnetization time $T_F$ is preferably chosen so that the primary/secondary current i has had time to decrease to 5% or less of its peak value equal to:

$$I_S\left(1 + \frac{1}{\sin(\varphi_1)}\right)$$

If the magnetization time $T_F$ is chosen greater than $(\pi+2\varphi_1)/\omega_1$, i.e. if it ends after the diode D is switched off, then the resonance of the output voltage $V_S$ stops before the end of the magnetization phase 503 and step 508 takes place. The magnetization time $T_F$ is then equal to the resonance time $T_{rés}$ plus the rest of the duration of the magnetization phase 503.

Generally speaking, the magnetization time $T_F$ is, for example, between:

$$\frac{\pi}{2}\sqrt{L_F C_S}$$

and $$\frac{3\pi}{2}\sqrt{L_F C_S}$$

i.e. between 25% and 75% of the sine wave period $T_{osc}$. In this way, the resonance portion may last for a time corresponding to a sine wave portion between a quarter of period $T_{osc}$ and three-quarters of period $T_{osc}$.

At a step 510, at the end of the magnetization time $T_F$, the control device 110 switches the regulation circuit 108 into the demagnetizing state by opening the switch INT. The magnetization time $T_F$ therefore also represents the duration of closure of the switch INT.

Figure 4:
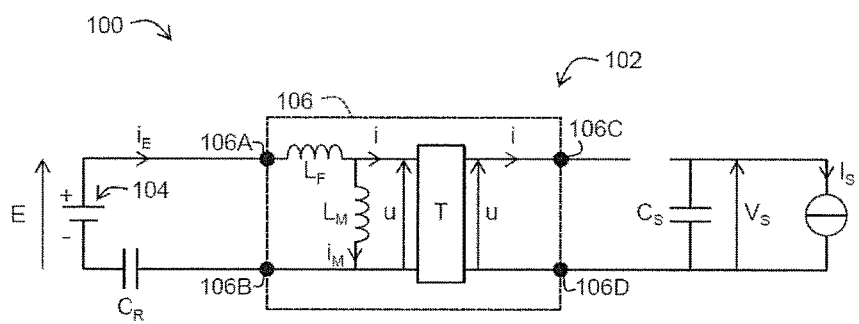
Figure 5:
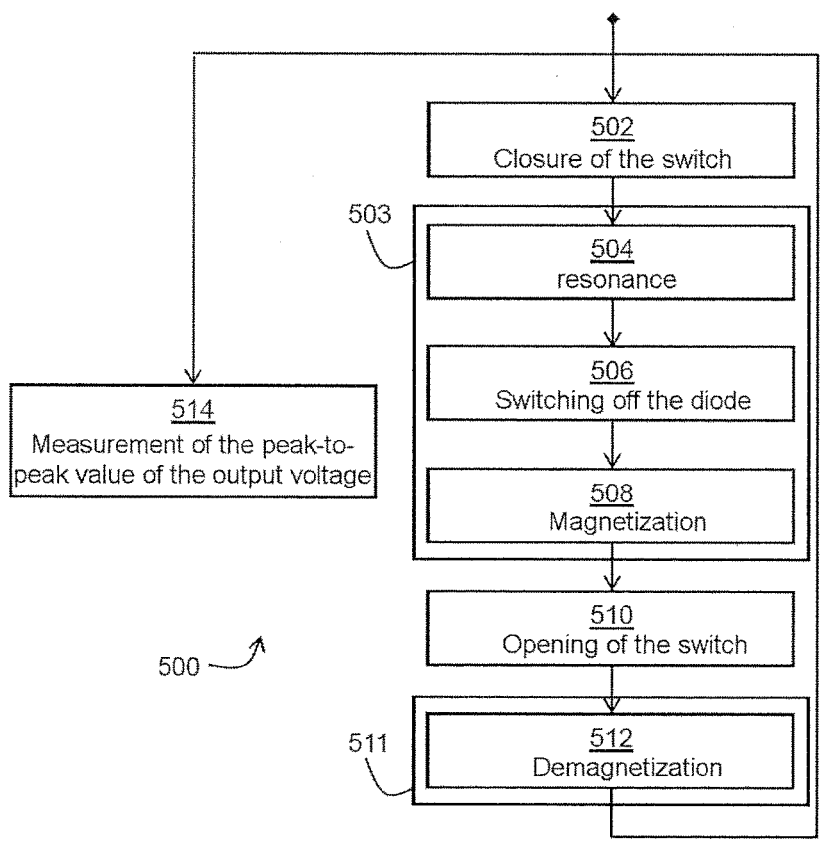
FIG. 5 is a block diagram of a method implemented with the power supply in FIG. 1.

The resultant circuit diagram is represented in FIG. 4.

At the time of step 510, the output voltage $V_S$ has decreased to a value $V_{S2}$:

$$V_{S2} = V_{S1} - \frac{I_S}{C_S}\left(T_F - \frac{\pi + 2\varphi_1}{\omega_1}\right)$$

and the magnetizing current $i_M$ has increased up to the value $i_{M2}$:

$$i_{M2} = i_{M1} + \frac{E}{L_F + L_M}\left(T_F - \frac{\pi + 2\varphi_1}{\omega_1}\right)$$

Of course, in the case where the closure time $T_F$ is equal to $(\pi 2\varphi_1)/\omega_1$, this gives: $V_{S1}=V_{S2}$ and $i_{M1}=i_{M2}$.

The demagnetization phase 511 begins after the opening 510 of the switch.

The demagnetization phase 511 comprises a step 512 in the course of which the electrical quantities evolve over time in the manner which will now be described.

The current stored in the output capacitor $C_S$ continues to be discharged in the current source $I_S$, so that the output voltage $V_S$ continues to decrease according to the equation:

$$V_s = V_{S2} - \frac{I_S}{C_S}t$$

Furthermore, according to FIG. 4, the voltage $V_{INT}$ and the magnetization current $i_M$ are linked via the following equations:

$$V_{INT} = E - (L_F + L_M)i_M'$$

$$i_M = C_R V_{INT}'$$

Thus, taking into account the fact that the magnetizing inductor $L_M$ is much greater than the leakage inductor $L_F$, the voltage $V_{INT}$ satisfies the differential equation:

$$E = (L_F + L_M)C_R V_{INT}'' + V_{INT}$$

Taking into account the initial conditions:

$$V_{INT}(0) = 0$$

$$i_M(0) = i_{M2}$$

the voltage $V_{INT}$ and the magnetization current $i_M$ oscillate according to the equations:

$$V_{INT} = E\left(1 - \frac{\cos(\omega_2 t + \varphi_2)}{\cos(\varphi_2)}\right)$$

$$i_M = i_{M2}\frac{\sin(\omega_2 t + \varphi_2)}{\sin(\varphi_2)}$$

with:

$$\omega_2 = \frac{1}{\sqrt{L_M C_R}}$$

and:

$$\varphi_2 = \arctan\left(\frac{i_{M2}}{C_R E \omega_2}\right)$$

The method then returns to step 502 of closing the switch INT. Step 502 is performed at the end of the demagnetization time $T_O$ after the opening of the switch INT (step 510). The demagnetization time $T_O$ therefore corresponds in particular to the duration of opening of the switch INT.

Step 502 of closing the switch INT is preferably performed at the time of the cancellation of the voltage $V_{INT}$ or close to the cancellation of the voltage $V_{INT}$, e.g. at 5% or less of its peak value equal to:

$$V_{INT} = E\left(1 + \frac{1}{\cos(\varphi_2)}\right)$$

For this, the opening time $T_O$ may be chosen equal to $(2\pi - 2\varphi_2)/\omega_2$ or close to this value, e.g. within 10%.

In steady state operation, on returning to step 502 of closing the switch INT, the output voltage $V_S$ has decreased to return to the value $V_{S0}$, given by the following equation:

$$V_{S0} = V_{S2} - \frac{I_S}{C_S}T_O$$

and the magnetization current $i_M$ reaches, in particular has decreased to, the value $i_{M0}$:

$$i_{M0} = i_{M2}\frac{\sin(\omega_2 T_O + \varphi_2)}{\sin(\varphi_2)}$$

Thus, in steady state, the minimum output voltage $V_{S0}$ is deduced from the preceding equations and equals:

$$V_{S0} = E - V_D - \frac{I_S}{2C_S}\left(T_F + T_O - \frac{\pi + 2\varphi_1}{\omega_1}\right)$$

It will be noted that in replacing $V_{S0}$ by this value in the expression of $\varphi_1$, $\varphi_1$ is in fact independent of the output current $I_S$.

In addition, the average voltage output $\langle V_S \rangle$ is:

$$\langle V_S \rangle = \frac{1}{T_F + T_O}\int_0^{T_F + T_O} V_S dt = E - V_D$$

Thus, thanks to the placing in resonance of the output capacitor $C_S$ and the leakage inductor $L_F$, the average output voltage $\langle V_S \rangle$ is not affected by the output load Z.

In parallel with the preceding steps, during a step 514 repeated over time, the measuring device 116 measures the peak-to-peak value of the output voltage $V_S$ and determines the secondary current i from the measurement. Thus, it is possible to determine the evolution of the secondary current over time.

Figure 6:
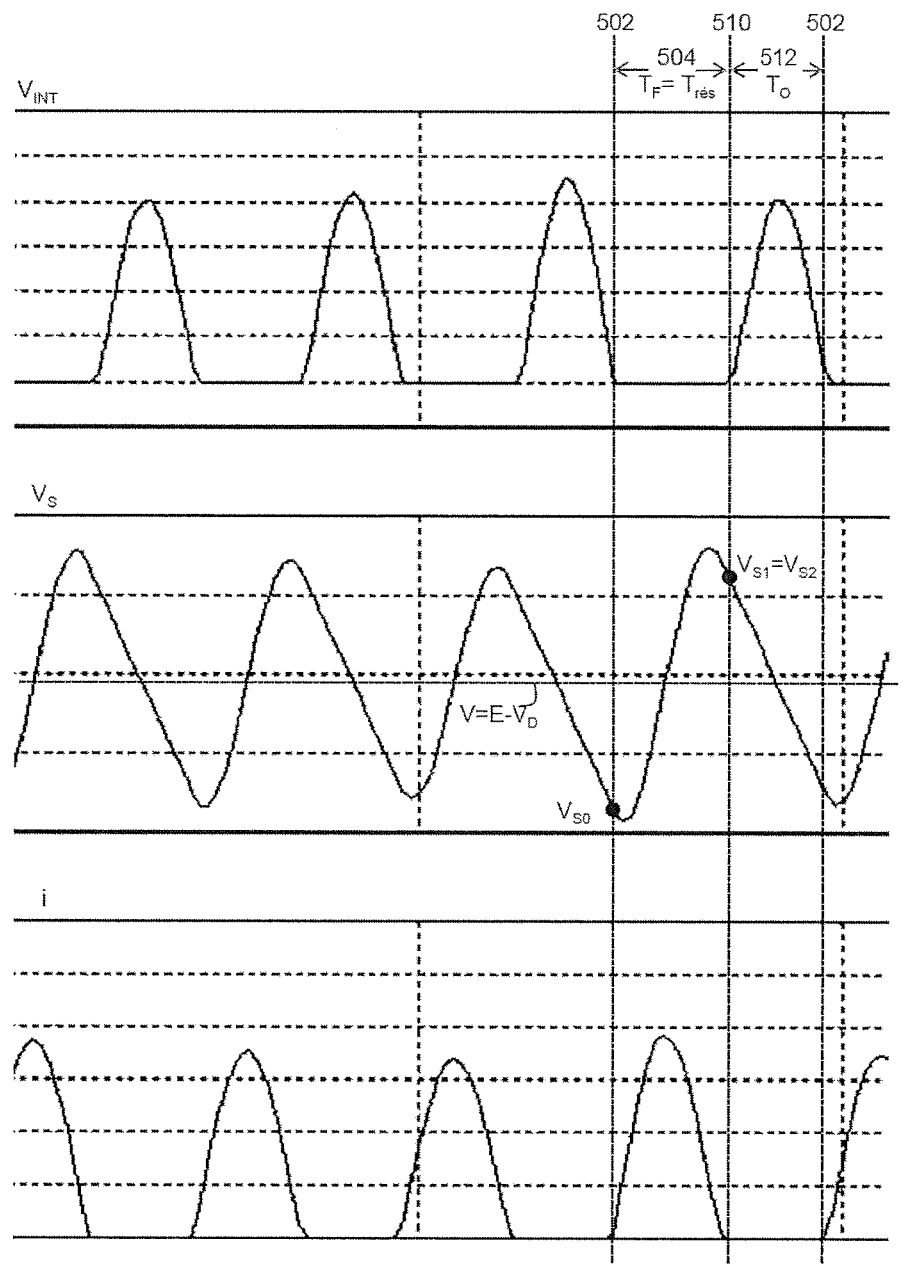
FIG. 6 includes timing diagrams of three electrical quantities of the electrical circuit in FIG. 1, in particular an output voltage $V_S$ of the electrical circuit in FIG. 1.

Timing diagrams of the voltage $V_{INT}$ at the terminals of the switch INT, the output voltage $V_S$ and the primary/secondary current i are represented in FIG. 6, in the case where the magnetization time $T_F$ is equal to $(\pi + 2\varphi_1)/\omega_1$. As explained previously, in this case, the magnetization phase 503 only comprises the step 504 and the resonance time $T_{rés}$ is equal to the magnetization time $T_F$.

It will be appreciated that during the magnetization phase 503, the primary/secondary current i travels in a sine arc starting from and returning to zero. During this time, the output voltage $V_S$ varies sinusoidally starting from the initial resonance value $V_{S0}$, which is below the median value $E - V_D$, and passing through the median value $E - V_D$. The output voltage $V_S$ then reaches the final resonance value $V_{S1}$ situated above the median value $E-V_D$.

During the demagnetization phase 511, the voltage $V_{INT}$ travels in a sine arc starting from zero and returning thereto. This facilitates the opening and closure of the switch INT. During this time, the output voltage $V_S$ decreases linearly to return to the initial resonance value $V_{S0}$.

Figure 7:
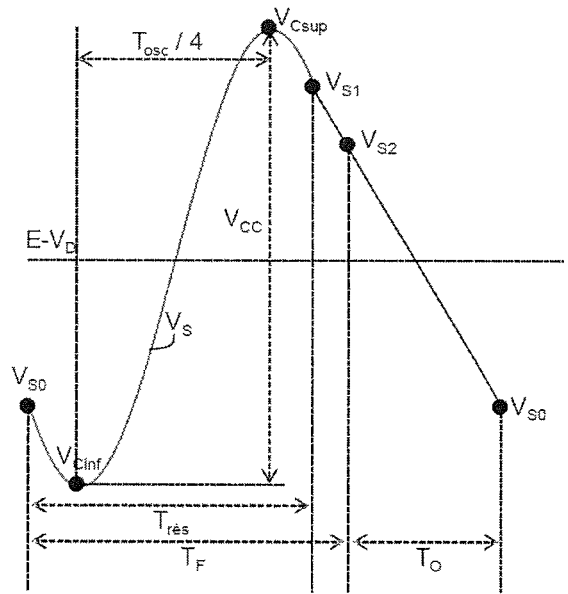
FIG. 7 is an enlargement of the timing diagram in FIG. 6 for the output voltage $V_S$.

Referring to FIG. 7, variations in the voltage $V_S$ will be described in more detail.

On a resonance portion 504 of the magnetization phase 503, the output voltage $V_S$ first of all follows a sine wave curve of period $T_{osc}$. The output voltage $V_S$ starts from the initial resonance value $V_{S0}$. It then decreases to reach a lower peak value $V_{Cinf}$ of the sine wave. The output voltage $V_S$ then increases and passes through the median value $E-V_D$, then reaches an upper peak value $V_{Csup}$ of the sine wave. The output voltage then decreases to reach the final resonance value $V_{S1}$. It will be appreciated that the final resonance value lies between the median value $E-V_D$ and upper peak value $V_{Csup}$ of the sine wave. As it is known in itself, two consecutive peak values are separated by a half period, so that the time between the peak values $V_{Cinf}$ and $V_{Csup}$ is equal to $T_{osc}/2$. The resonance portion lasts for the resonance time $T_{rés}$.

When the secondary current cancels out to become negative, the diode D is switched off and the output voltage $V_S$ then no longer displays a sine wave appearance. During the rest 508 of the magnetization phase 503, the output voltage $V_S$ decreases linearly until reaching, at the end of the magnetization phase 503, the value $V_{S2}$. The opening 510 of the switch INT signals the end of the magnetization phase 503 and the beginning of the demagnetization phase 511.

During the demagnetization phase, the output voltage $V_S$ continues to decrease linearly from the value $V_{S2}$ until reaching the initial resonance value $V_{S0}$ at the end of the demagnetization time $T_O$.

At that moment, a new magnetization phase 503 begins.

In the case illustrated in FIG. 7, the peak-to-peak value $V_{CC}$ of the output voltage $V_S$, i.e. the difference between the two extreme values taken by the voltage $V_S$ over a period of operation $T_F+T_O$ (two consecutive magnetization and demagnetization phases), is equal to the difference between the lower $V_{Cinf}$ and upper $V_{Csup}$ peak values of the sine wave.

Figure 8:
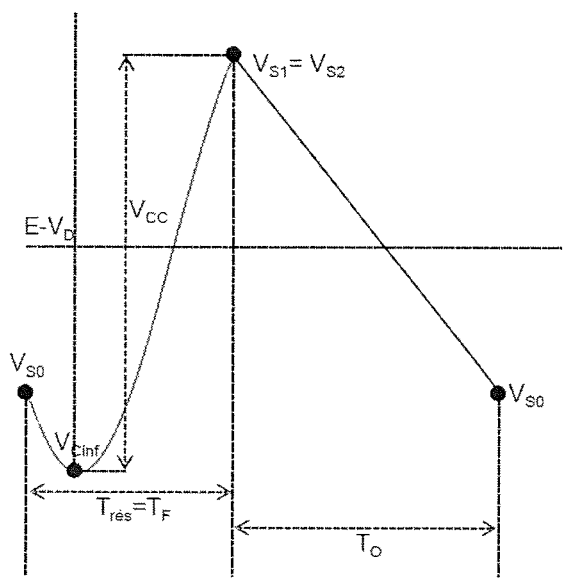
FIG. 8 is a timing diagram of the output voltage $V_S$ in another embodiment of the invention.

Referring to FIG. 8, the variations in the voltage $V_S$ will be described in more detail, in the case where the magnetization phase 503 ceases before the diode D is switched off.

In this case, during the magnetization phase 503, the output voltage $V_S$ first of all follows a sine wave curve of period $T_{osc}$. The output voltage $V_S$ starts from the initial resonance value $V_{S0}$. It then decreases to reach a lower peak value $V_{Cinf}$ of the sine wave. The output voltage $V_S$ then increases and passes through the median value $E-V_D$, then reaches the final resonance value $V_{S1}$, which may be less than the upper peak value $V_{Csup}$ of the sine wave.

In the demagnetization phase 511, the switch INT is open for a time $T_O$. Then, the output voltage $V_S$ decreases linearly from the final resonance value $V_{S1}$ until reaching the initial resonance value $V_{S0}$ at the end of the demagnetization time $T_O$.

Subsequently, a new magnetization phase 503 begins.

In the case illustrated in FIG. 8, the peak-to-peak value $V_{CC}$ of the output voltage $V_S$, i.e. the difference between the two extreme values taken by the voltage $V_S$ over a period of operation $T_F+T_O$, is equal to the difference between the lower peak value $V_{Cinf}$ of the sine wave and the final resonance value $V_{S1}$.

The position on the sine wave curve where the resonance of the output voltage $V_S$ stops is not limited to what is illustrated in FIGS. 7 and 8.

Figure 9:
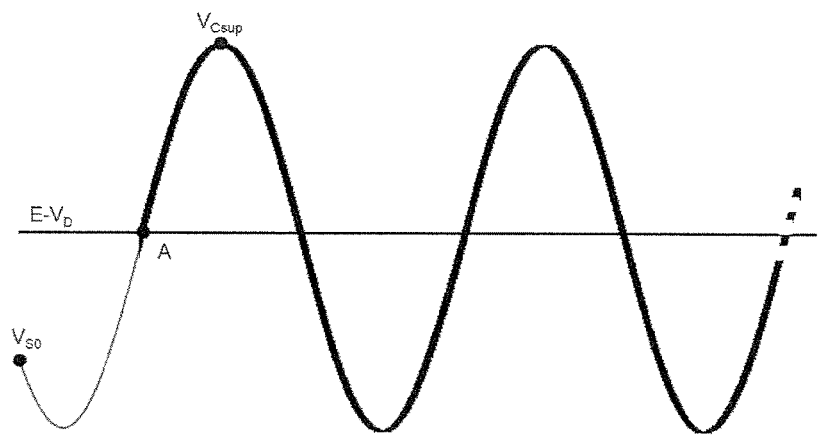
FIGS. 9 to 12 represent oscillation curves followed by the output voltage $V_S$ when it is in resonance according to various embodiments of the invention, portions of the curves being highlighted where the resonance may cease.

Referring to FIG. 9, in general, the magnetization time $T_F$ and the value of the output capacitor $C_S$ are such that, on the resonance portion 504 of the magnetization phase 503, the output voltage $V_S$ describes a sine wave portion having a median value V and, starting from an initial value $V_{S0}$ below the median value V, passes through the median value V. Thus, in this case, the resonance may be stopped at any place on the sine wave curve as long as the median value V has been exceeded once. The resonance may thus extend over several periods of the sine wave. The median value V is in particular equal to $E-V_D$.

Such a long resonance may be obtained by replacing the diode D of the power supply 102 in FIG. 1 by a controlled switch, closed during the magnetization phase 503 and open during the demagnetization phase 511. In this case, the magnetization time $T_F$ can be chosen sufficiently long. By contrast, the diode D requires stopping the resonance slightly after the upper peak $V_{Csup}$ of the sine wave.

Thus, the end of the resonance may occur at any moment after point A, corresponding to the first time when the voltage $V_S$ reaches the median value $E-V_D$. The portion of the sine wave curve where the resonance may stop is indicated in bold.

Figure 10:
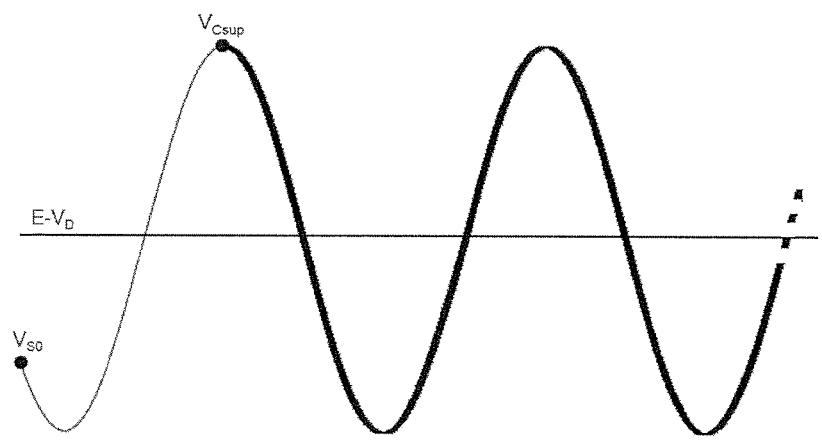

Referring to FIG. 10, preferably, the magnetization time $T_F$ and the value of the output capacitor $C_S$ are such that, on the resonance portion 504, the output voltage $V_S$ passes through the first upper peak value $V_{Csup}$ of the sine wave.

Thus, the end of the resonance may be situated at any moment after the upper peak $V_{Csup}$ of the sine wave. The portion of the sine wave curve where the resonance may stop is indicated in bold.

Figure 11:
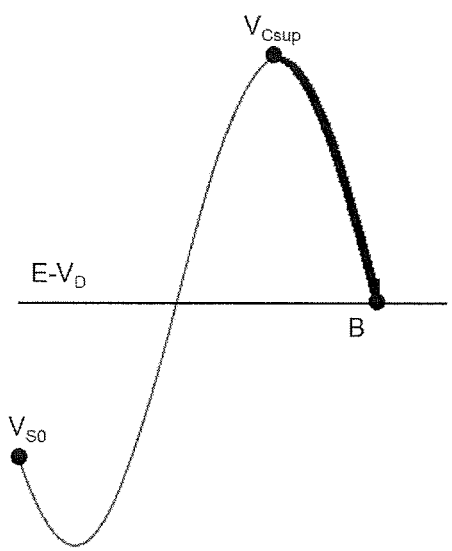
Figure 12:
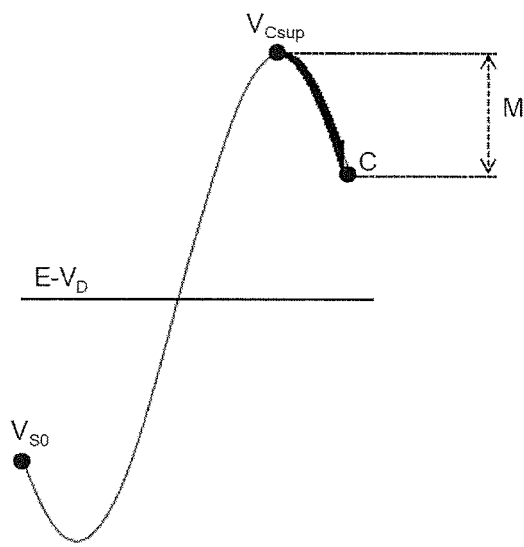

Referring to FIG. 11, preferably again, the magnetization time $T_F$ and the value of the output capacitor $C_S$ are such that, after passing the upper peak value $V_{Csup}$ of the sine wave, the output voltage $V_S$ decreases during the rest of the resonance portion 504 up to but not exceeding the median value $E-V_D$.

Thus, the end of the resonance 504 is situated between the upper peak $V_{Csup}$ of the sine wave and the point B corresponding to the second time when the output voltage $V_S$ passes through the median value $E-V_D$. The portion of the sine wave curve where the resonance may stop is indicated in bold.

Preferably again, the magnetization time $T_F$ and the value of the output capacitor $C_S$ are such that, after passing the upper peak value $V_{Csup}$ of the sine wave, the output voltage $V_S$ decreases during the rest of the resonance portion 504 by an amount M equal to no more than 50% of the difference between the upper peak value $V_{Csup}$ of the sine wave and the median value $E-V_D$.

Thus, the end of the resonance is situated between the upper peak $V_{Csup}$ of the sine wave and the point C corresponding to the median value between the upper peak value $V_{Csup}$ of the sine wave and the median value $E-V_D$. The portion of the sine wave curve where the resonance may stop is indicated in bold.

The amount M is, for example, no more than 25% of the difference between the upper peak value $V_{Csup}$ of the sine wave and the median value $E-V_D$.

Figure 13:
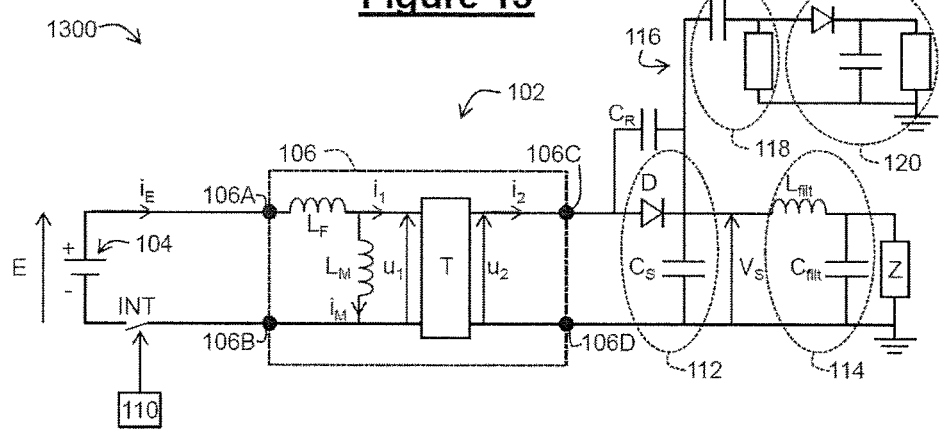
FIGS. 13 and 14 represent electrical circuits comprising power supplies according to other embodiments of the invention.

Referring to FIG. 13, in another embodiment 1300, the demagnetization capacitor $C_R$ is in parallel with the diode D.

Figure 14:
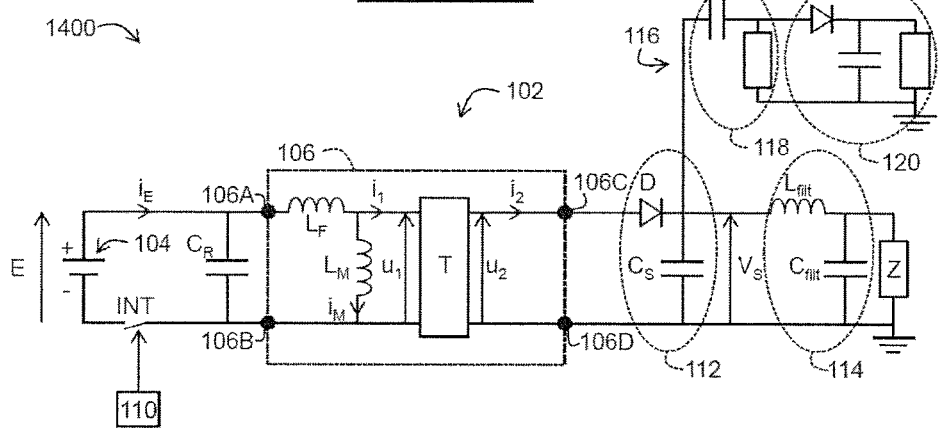

Referring to FIG. 14, in another embodiment 1400, the demagnetization capacitor $C_R$ is connected between the terminals 106A, 106B of the transformer 106 primary.

The present invention is not limited to the embodiments previously described, but is on the contrary defined by the claims that follow. Indeed, it will be apparent to the person skilled in the art that modifications may be made thereto.

For example, instead of the demagnetization $T_O$ and magnetization $T_F$ times being pre-recorded, the measuring device 116 could dynamically switch the demagnetization circuit. In this case, the measuring device 116 could comprise a circuit for measuring the voltage $V_{INT}$ and/or a circuit for measuring the secondary current $i_2$ and switching the regulation circuit 108 to the demagnetizing state when the secondary current is measured as zero or almost zero, and to the magnetizing state when the voltage $V_{INT}$ is measured as zero or almost zero.

In addition, according to the characteristics of the chosen electrical components, it may happen that the diode D is switched on before the end of the demagnetization time $T_O$.

Furthermore, the terms used in the claims should not be construed as limited to the elements of the embodiments previously described, but should on the contrary be understood as covering all the equivalent elements that a person skilled in the art may deduce from what is general knowledge in the art.

The invention claimed is:

1. A power supply comprising:
   a transformer comprising a primary configured to be connected to a voltage source and a leakage inductor, the transformer configured to be traversed by a magnetizing current;
   a magnetizing current regulation circuit configured to switch between:
      a magnetizing state in which the regulation circuit allows the magnetizing current to increase, and
      a demagnetizing state in which the regulation circuit reduces the magnetizing current;
   a control device for controlling the regulation circuit and to switch the regulation circuit alternately from the magnetizing state to the demagnetizing state for respectively alternating a magnetization phase and a demagnetization phase, the control device being also configured to prolong the magnetization phase for a magnetization time;
   an output capacitor connected to a secondary of the transformer to form a resonant circuit with the leakage inductor, a voltage between terminals of the output capacitor corresponding to an output voltage of the power supply,
   wherein said control device is configured so that the magnetization time and a value of the output capacitor are such that on a resonance portion of the magnetization phase, the output voltage describes a sine wave portion and, starting from an initial value below a median value of a sine wave, passes through said median value,
   wherein the magnetization time and the value of the output capacitor are such that, on the resonance portion, the output voltage passes through an upper peak value of the sine wave, and
   wherein the magnetization time and the value of the output capacitor are such that, after passing the upper peak value of the sine wave, the output voltage decreases during a rest of the resonance portion up to but not exceeding the median value of the sine wave, and by an amount of no more than 25% of a difference between the upper peak value of the sine wave and the median value.

2. The power supply according to claim 1, wherein the resonance portion extends over an entire magnetization phase.

3. The power supply according to claim 1, wherein the magnetization time is between 25% and 75% of the sine wave period.

4. The power supply according to claim 1 wherein a variations in the output voltage during the resonance portion describe the sine wave portion having a period dependent on the value of the output capacitor, the value of the output capacitor being such that said period is between 0.1 and 2 microseconds.

5. The power supply according to claim 1, wherein the magnetization time is between:

$$\frac{\pi}{2}\sqrt{L_F C_S}$$

and $$\frac{3\pi}{2}\sqrt{L_F C_S}$$

where $L_F$ is a value of the leakage inductor of the transformer and $C_S$ is the value of the output capacitor.

6. The power supply according to claim 1, wherein the output capacitor has a value between 0.5 and 200 nanofarads.

7. The power supply according to claim 1, wherein the transformer secondary comprises a high terminal intended to present a high potential and through which a secondary current is intended to be output and a low terminal configured to present a low potential with respect to the high potential of the high terminal.

8. The power supply according to claim 7, further comprising:
   a diode intended to prevent a flow of a secondary current to the transformer secondary via the high terminal.

9. The power supply according to claim 7, wherein the magnetization time is such that, at an end of the magnetization state, the secondary current is zero or is no more than 5% of a peak value.

10. The power supply according to claim 8, wherein the regulation circuit comprises: a switch of which a closed state corresponds to one of the magnetizing and demagnetizing states of the regulation circuit and of which an open state corresponds to the other of the magnetizing and demagnetizing states of the regulation circuit, and a demagnetization capacitor intended to cause an oscillation of the magnetizing current during the demagnetization phase.

11. The power supply according to claim 10, wherein the demagnetization capacitor is in parallel with the switch.

12. The power supply according to claim 10, wherein the demagnetization capacitor is connected between terminals of the transformer primary.

13. The power supply according to claim 10, wherein the demagnetization capacitor is in parallel with the diode.

14. The power supply according to claim 10, in which the demagnetization capacitor is further configured to cause an oscillation of a voltage at terminals of the switch during the demagnetization phase in the course of which the regulation circuit is in the demagnetizing state, and the control device is configured to prolong the demagnetization phase for a demagnetization time such that, at the end of the demagnetization time, when the switch is closed for passing from the demagnetizing state to the magnetizing state, the voltage at the terminals of the switch is zero or is no more than 5% of its peak value.

15. The power supply according to claim 1, further comprising a device for measuring a peak-to-peak value of the output voltage.

16. The power supply according to claim 15, wherein the measuring device is further configured to estimate an output current supplied by the terminal of the output capacitor connected to a high terminal of the transformer secondary from the peak-to-peak value of the output voltage.

17. A voltage converter comprising:
a circuit having a first portion linked to a first electrical earth and a second portion linked to a second electrical earth, said portions being separated by a galvanic isolation; and
a power supply according to claim 1 for supplying an electrical load located in one of the portions with energy originating from the other portion through said galvanic isolation.

18. The power supply according to claim 1, further comprising:
a device for measuring a peak-to-peak value of the output voltage comprising:
a high-pass filter, and
a peak detector circuit, wherein the measuring device is further configured to estimate an output current supplied by the terminal of the output capacitor connected to a high terminal of the transformer secondary from the peak-to-peak value of the output voltage.

19. A method for controlling a power supply, the power supply comprising:
a transformer comprising a primary configured to be connected to a voltage source and a leakage inductor, the transformer configured to be traversed by a magnetizing current,
a magnetizing current regulation circuit intended to switch between:
a magnetizing state in which the regulation circuit is intended to allow the magnetizing current to increase,
a demagnetizing state in which the regulation circuit is intended to reduce the magnetizing current,
an output capacitor connected to a secondary of the transformer to form a resonant circuit with the leakage inductor, the output capacitor having an output voltage between terminals of the output capacitor,
wherein the magnetization time and a value of the output capacitor are such that, on a resonance portion, the output voltage passes through an upper peak value of a sine wave, and
wherein the magnetization time and the value of the output capacitor are such that, after passing the upper peak value of the sine wave, the output voltage decreases during a rest of a resonance portion up to but not exceeding a median value of the sine wave, and by an amount of no more than 25% of a difference between the upper peak value of the sine wave and the median value,
the method comprising:
switching, with a control device of the power supply, the regulation circuit alternately from the magnetizing state to the demagnetizing state for respectively alternating a magnetization phase and a demagnetization phase, said control device being configured such that the magnetization phase lasting for a magnetization time which is a function of the value of the output capacitor in such a way that on the resonance portion of the magnetization phase, the output voltage describes a sine wave portion and, starting from an initial value below the median value of the sine wave, passes through said median value.

20. A power supply comprising:
a transformer comprising a primary configured to be connected to a voltage source and a leakage inductor, the transformer configured to be traversed by a magnetizing current;
a magnetizing current regulation circuit configured to switch between:
a magnetizing state in which the regulation circuit allows the magnetizing current to increase, and
a demagnetizing state in which the regulation circuit reduces the magnetizing current;
a control device for controlling the regulation circuit and to switch the regulation circuit alternately from the magnetizing state to the demagnetizing state for respectively alternating a magnetization phase and a demagnetization phase, the control device being also configured to prolong the magnetization phase for a magnetization time;
an output capacitor connected to a secondary of the transformer to form a resonant circuit with the leakage inductor, a voltage between terminals of the output capacitor corresponding to an output voltage of the power supply,
wherein said control device is configured so that the magnetization time and a value of the output capacitor are such that on a resonance portion of the magnetization phase, the output voltage describes a sine wave portion and, starting from an initial value below a median value of a sine wave, passes through said median value, and
wherein the magnetization time is between:

$$\frac{\pi}{2}\sqrt{L_F C_S}$$

and $$\frac{3\pi}{2}\sqrt{L_F C_S}$$

where $L_F$ is a value of the leakage inductor of the transformer and $C_S$ is the value of the output capacitor.

* * * * *